(12) United States Patent
Coon et al.

(10) Patent No.: US 10,228,684 B2
(45) Date of Patent: Mar. 12, 2019

(54) AUTOMATED FASTENER INSERT INSTALLATION SYSTEM FOR COMPOSITE PANELS

(71) Applicant: THE BOEING COMPANY, Huntington Beach, CA (US)

(72) Inventors: Aaron Coon, Marysville, WA (US); Chris G. McInelly, Stanwood, WA (US); Bret Hoeksema, Zeeland, MI (US); Ryan Lillibridge, Marne, MI (US); Tom Allen, Holland, MI (US); Steve Solack, Nunica, MI (US); Kevin Bowe, Grand Rapids, MI (US); Gary K. Allen, Everett, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 14/949,278

(22) Filed: Nov. 23, 2015

(65) Prior Publication Data
US 2017/0146984 A1     May 25, 2017

(51) Int. Cl.
    *G05B 19/418*     (2006.01)
    *B23P 19/00*     (2006.01)
    (Continued)

(52) U.S. Cl.
    CPC ...... *G05B 19/41805* (2013.01); *B23P 19/001* (2013.01); *B23P 19/04* (2013.01);
    (Continued)

(58) Field of Classification Search
    CPC .... G05B 19/41805; G05B 2219/40111; B32B 7/08; B32B 3/06; B32B 3/266;
    (Continued)

(56) References Cited

U.S. PATENT DOCUMENTS

| 4,203,204 A | 5/1980 | Murphy |
| 4,310,964 A | 1/1982 | Murphy |

(Continued)

FOREIGN PATENT DOCUMENTS

| FR | 2990890 A1 | 11/2013 |
| WO | 2007038740 A2 | 4/2007 |

OTHER PUBLICATIONS

Alain (FR 2990890 AI) machine translation.*
International Search Report for Application No. 16187427.6 dated Apr. 3, 2017.

*Primary Examiner* — Yasser A Abdelaziez
(74) *Attorney, Agent, or Firm* — Womble Bond Dickinson (US) LLP

(57) ABSTRACT

An automated fastener insert installation system for composite panels is provided. A first module receives and secures a composite panel with respect to an origin of a first coordinate system, wherein the composite panel has opposed major surfaces and defines an insert-receiving orifice extending through one of the major surfaces, and is secured such that one of the major surfaces is externally accessible. A second module engages each of a plurality of fastener inserts with an installation aide. Third module determines a configuration of the orifice defined by the composite panel, selects a corresponding one of the fastener inserts engaged with the installation aide, inserts the selected fastener insert into the orifice, and dispenses an adhesive material through the installation aide and into the orifice about selected fastener insert such that the adhesive material secures the selected fastener insert within the orifice. Associated systems are also provided.

13 Claims, 6 Drawing Sheets

(51) Int. Cl.
| | |
|---|---|
| *B23P 19/04* | (2006.01) |
| *F16B 5/01* | (2006.01) |
| *B32B 7/08* | (2019.01) |
| *B32B 3/06* | (2006.01) |
| *B32B 3/26* | (2006.01) |
| *B29L 31/30* | (2006.01) |
| *B29C 65/48* | (2006.01) |
| *B29C 65/54* | (2006.01) |
| *B29C 65/56* | (2006.01) |
| *B29C 65/78* | (2006.01) |
| *B29C 65/00* | (2006.01) |

(52) U.S. Cl.
CPC ............... *B32B 3/06* (2013.01); *B32B 3/266* (2013.01); *B32B 7/08* (2013.01); *F16B 5/01* (2013.01); *B29C 65/483* (2013.01); *B29C 65/542* (2013.01); *B29C 65/564* (2013.01); *B29C 65/7802* (2013.01); *B29C 66/30321* (2013.01); *B29C 66/30325* (2013.01); *B29C 66/474* (2013.01); *B29C 66/72525* (2013.01); *B29C 66/863* (2013.01); *B29L 2031/3076* (2013.01); *B32B 2305/024* (2013.01); *B32B 2607/00* (2013.01); *G05B 2219/40111* (2013.01)

(58) Field of Classification Search
CPC ............. B32B 2607/00; B32B 2305/24; B23P 19/001; B23P 19/04; F16B 5/01; B29L 2031/3076; B29C 65/483; B29C 65/542; B29C 65/564; B29C 65/7802; B29C 66/30321; B29C 66/30325; B29C 66/474; B29C 66/72525; B29C 66/863; B29C 65/601–65/609
See application file for complete search history.

(56) References Cited

U.S. PATENT DOCUMENTS

| | | | |
|---|---|---|---|
| 4,978,265 A | | 12/1990 | De Wan |
| 6,154,279 A | * | 11/2000 | Thayer ................... G01B 11/22 |
| | | | 356/602 |
| 8,136,328 B2 | | 3/2012 | Erickson et al. |
| 8,661,684 B1 | | 3/2014 | Boyd et al. |
| 2014/0203039 A1 | * | 7/2014 | Maas ................... B05C 17/002 |
| | | | 222/52 |

* cited by examiner

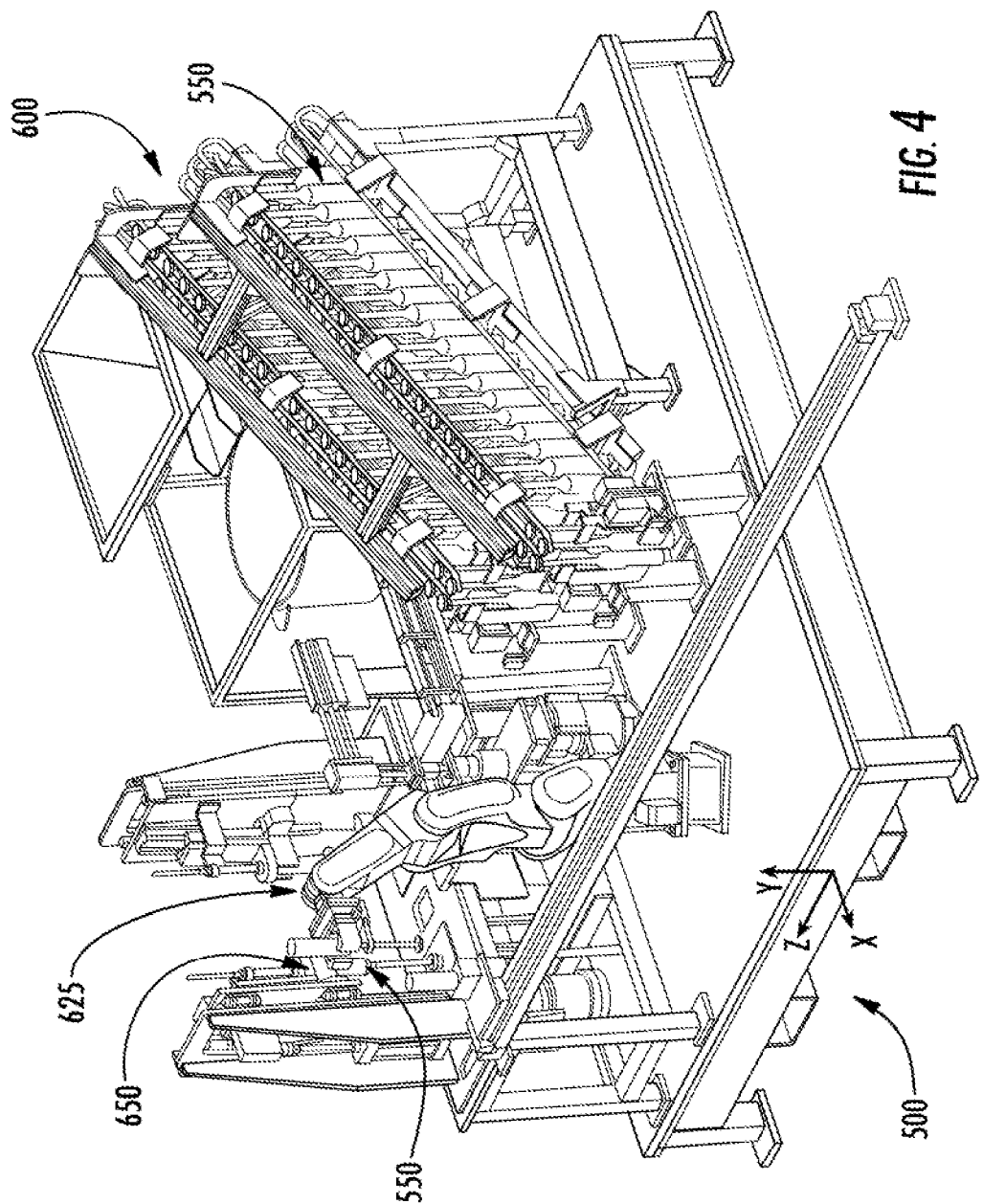

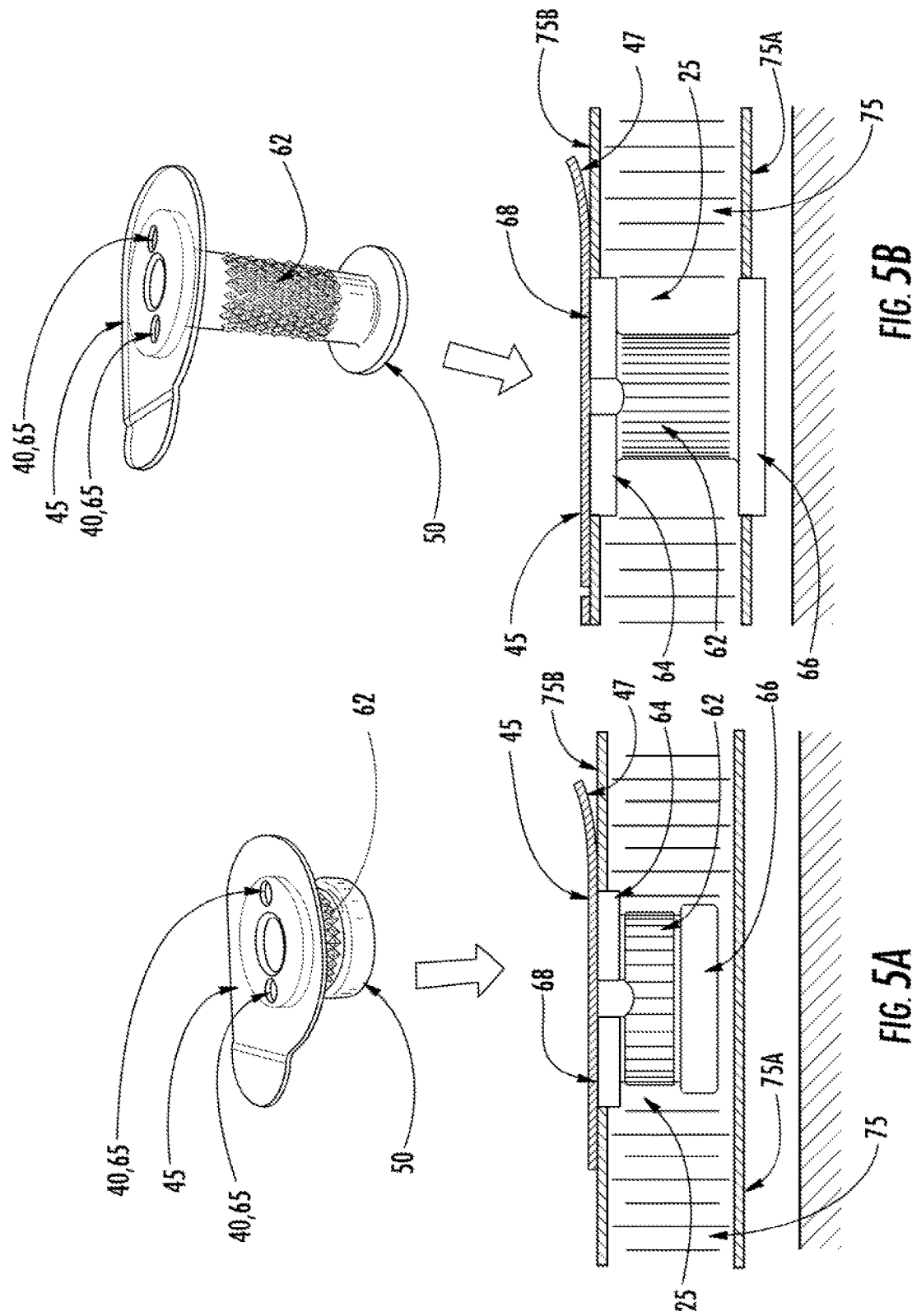

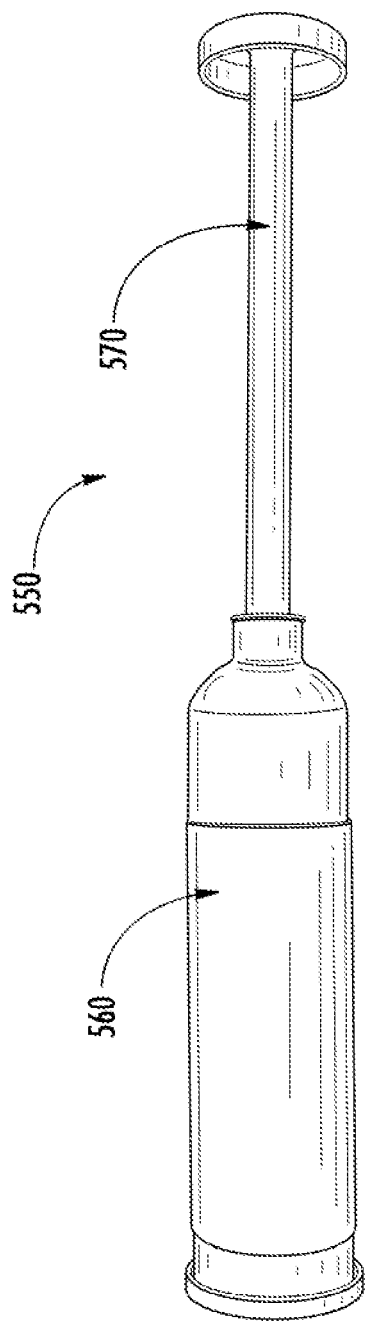

AUTOMATED FASTENER INSERT INSTALLATION SYSTEM FOR COMPOSITE PANELS

BACKGROUND

Field of the Disclosure

The present disclosure is directed to an automated fastener insert installation system for composite panels.

Description of Related Art

Composite panels, such as honeycomb-cored sheets, often cannot have mechanical fasteners directly affixed thereto. In some instances wherein such a composite panel may require a mechanical fastener to be affixed thereto, a fastener-receiving insert may first be installed in and secured to the composite panel, and the mechanical fastener is then engaged with the insert. In this manner, the mechanical fastener can be used with the installed insert to secure the composite panel to other composite panels or structures.

However, such inserts often require a high degree of precision and conformance to tolerances when installed in the composite panel in order to provide an effective anchor for the mechanical fastener. For example, there may be several configurations or sizes of inserts, and each insert requires that the insertion orifice in the composite panel be correspondingly configured or sized. It is not desirable to install an insert configured for a through-hole orifice in a blind-hole-configured orifice, and vice versa. Moreover, insert-receiving-orifice defined by the composite panel must have an appropriate diameter and/or length/depth corresponding to the diameter and/or length of the insert received thereby. Further, the inserts may have to be installed so as to be as close to flush or coplanar with the outer surface of the composite panel as possible, in order to provide optimal interaction with the mechanical fastener and structural integrity of the assembled end product. In addition, such an insert may often be installed in the composite panel using an adhesive material (i.e., a special purpose two-part potting compound). However, such a special purpose potting compound typically requires careful handling, but also has a limited time in which it can be applied once mixed or actuated. Also, such a potting compound cures and hardens, once applied, which may limit re-work opportunities in the event of an imprecise insert installation procedure. In some instances, one imprecise insert installation in a composite panel will, at a minimum, require labor intensive rework, and may cause that composite panel to be designated as scrap.

As such, there exists a need for a system and method for installing fastener inserts in composite panels that addresses issues in a conventional process.

SUMMARY OF THE DISCLOSURE

The above and other needs are met by aspects of the present disclosure which, in one aspect, provides an automated fastener insert installation system for use in a composite panel fastener insert installation process. Such a system comprises an analysis device configured to determine a configuration or a size of the insert-receiving orifice defined by and extending through a major surface of a composite panel. A manipulation device is in communication with the analysis device and is configured to select and retrieve one of a plurality of fastener inserts engaged with an installation aide, in response to the configuration or the size of the insert-receiving orifice determined by the analysis device, and to insert the selected fastener insert into the insert-receiving orifice such that the installation aide engages the major surface of the composite panel. An adhesive dispenser device is configured to dispense an adhesive material through adhesive application orifices defined by the installation aide and the selected fastener insert, and into the insert-receiving orifice about selected fastener insert, such that the adhesive material interacts with the selected fastener insert and the composite panel defining the insert-receiving orifice so as to secure the selected fastener insert within the insert-receiving orifice.

Another aspect of the present disclosure provides an automated fastener insert installation system for use in a composite panel fastener insert installation process. Such a system comprises an adhesive material preparation system, including a mixing device configured to mix and actuate the adhesive material in an adhesive material kit, and a manipulation device configured to direct the adhesive material kit to the mixing device and to direct the adhesive material kit having the mixed and actuated adhesive material therein from the mixing device for dispensation.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Figure 1:
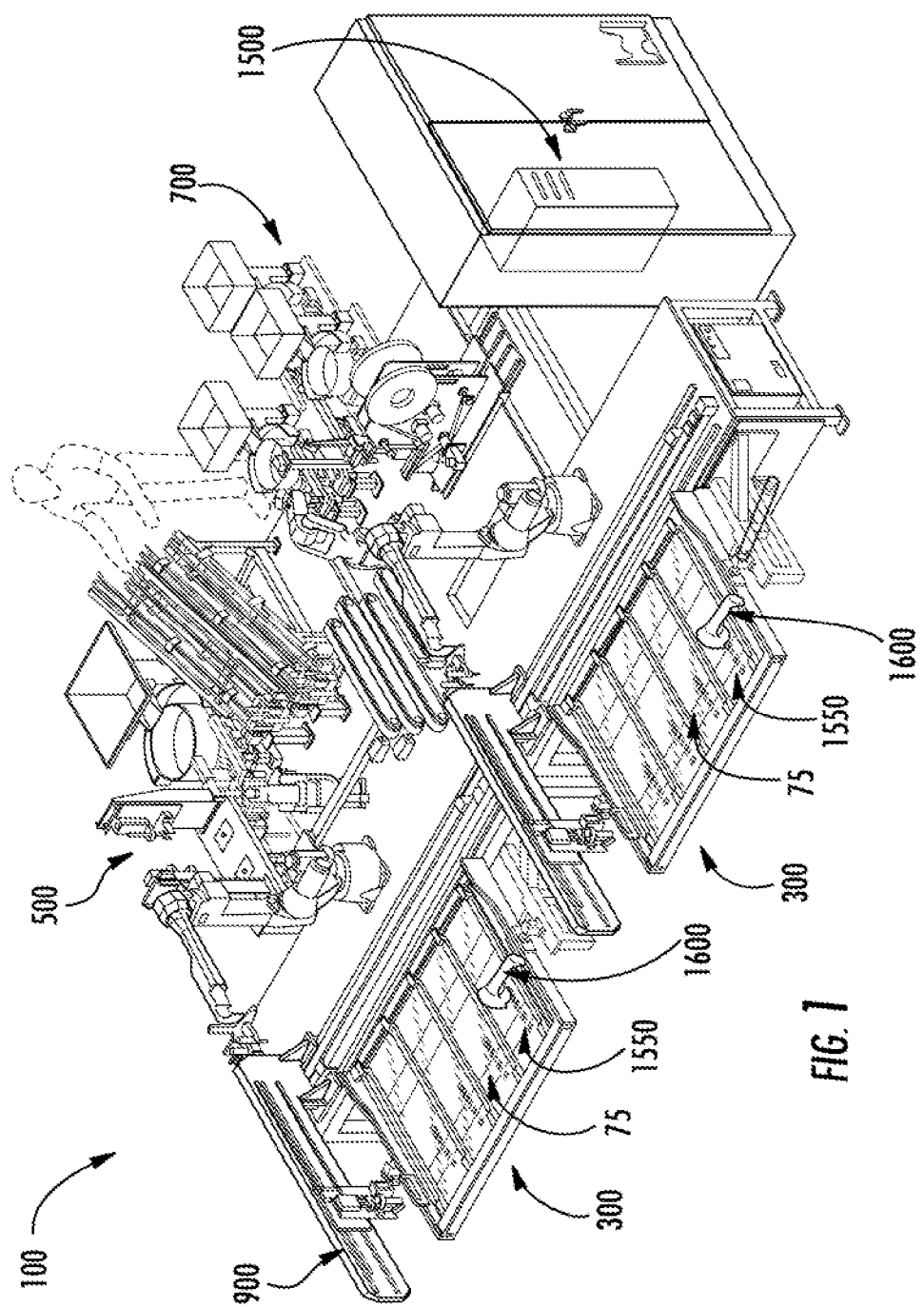
Figure 2:
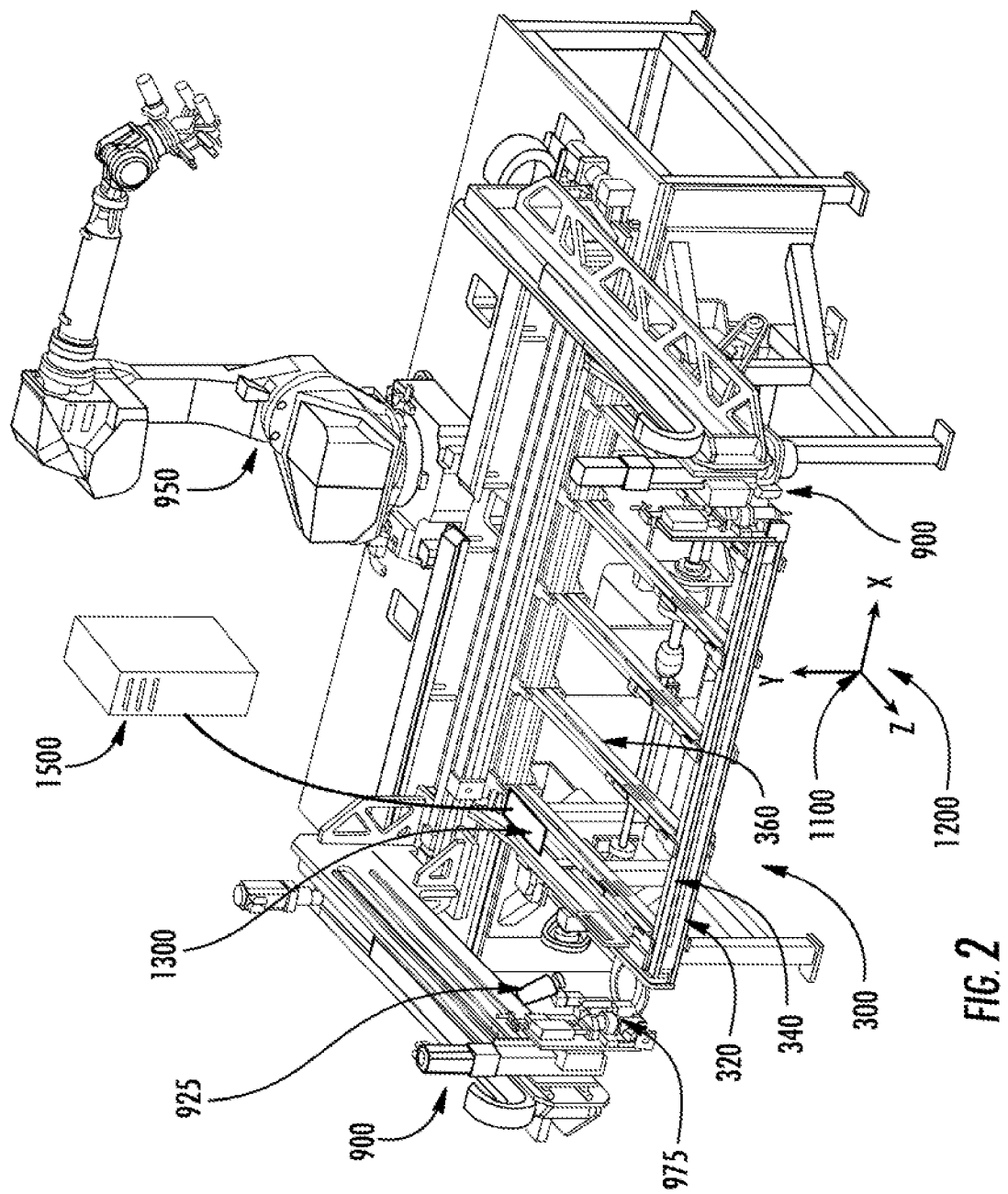
Figure 3:
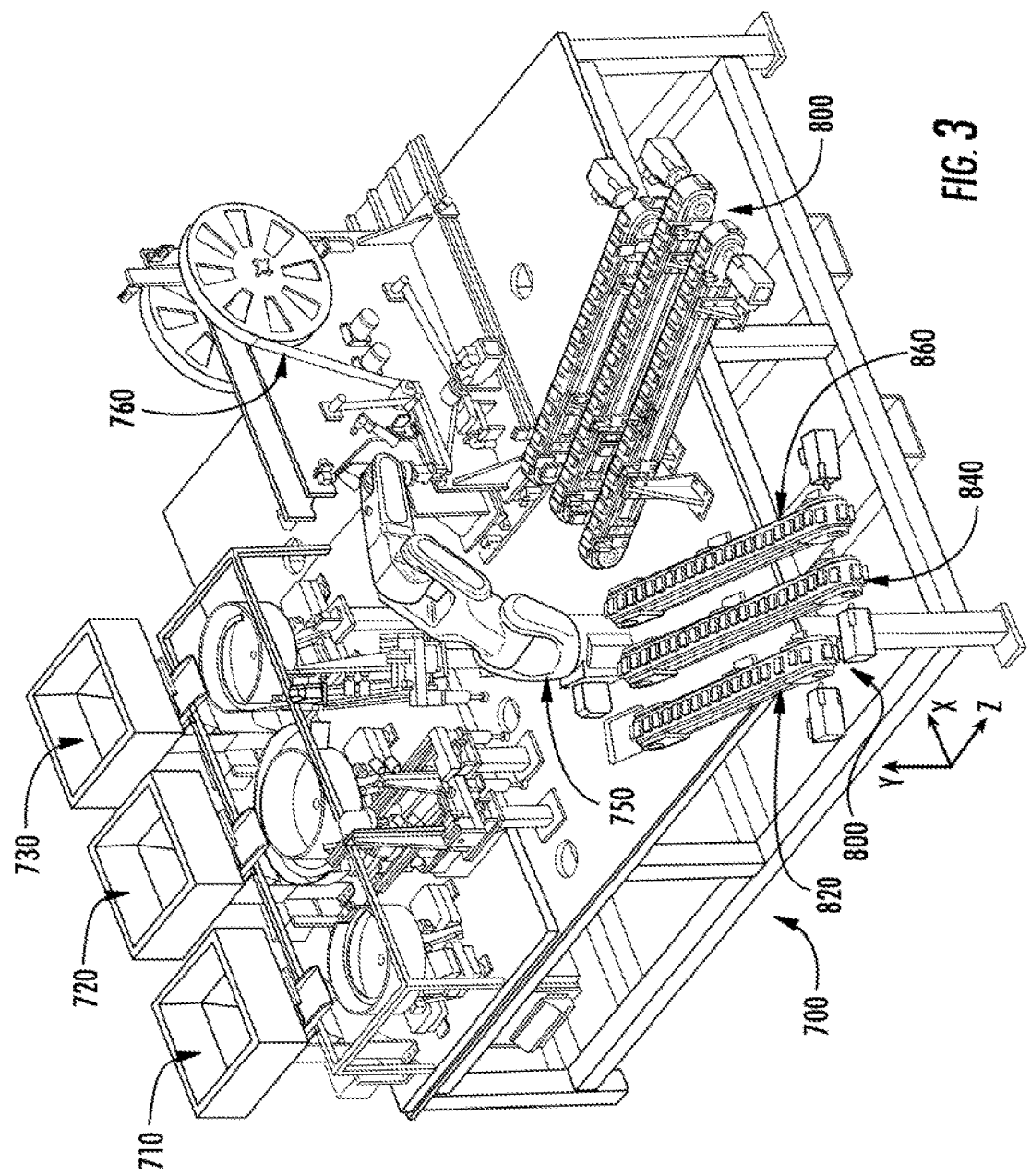

Having thus described the disclosure in general terms, reference will now be made to the accompanying drawings, which are not necessarily drawn to scale, and wherein:

FIG. 1 schematically illustrates a fastener insert installation system, according to one aspect of the present disclosure;

FIG. 2 schematically illustrates a panel handling system and a fastener insert installation system, according to one aspect of the present disclosure;

FIG. 3 schematically illustrates a fastener insert assembly system, according to one aspect of the present disclosure;

FIG. 4 schematically illustrates an adhesive material preparation system, according to one aspect of the present disclosure;

FIG. 5A schematically illustrates an example configuration of a blind hole fastener insert, according to one aspect of the present disclosure;

FIG. 5B schematically illustrates an example configuration of a through-hole fastener insert, according to one aspect of the present disclosure; and FIG. 6 schematically illustrates an adhesive material kit, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As schematically illustrated in FIG. 1, one aspect of the present disclosure provides an automated fastener insert installation system 100, which may be particularly applicable to composite panels, such as, for example, a honeycomb-cored sheet. Such a system 100 may generally comprise a panel handling module or system 300, an adhesive material preparation module or system 500, a fastener insert assembly module or system 700, and a fastener insert installation module or system 900, configured to cooperate to automatically insert a fastener insert 50 (see, e.g., FIGS. 5A and 5B) into a composite panel 75.

The panel handling module or system 300 as shown, for example, in FIG. 2, is configured to receive and secure the composite panel 75 with respect to an origin 1100 of a first coordinate system 1200. The composite panel 75 is generally in the form of a sheet, and has opposed major surfaces 75A, 75B (see, e.g., FIGS. 5A and 5B). In some instances, the fastener insert installation system 100 may be a downstream process receiving a previously-processed composite panel 75. That is, in a previous upstream process, the composite panel 75 may be processed through a milling machine/device (not shown) configured to form at least one insert-receiving orifice 25 in the composite panel 75, with the at least one orifice 25 extending through one of the major surfaces 75A, 75B of the composite panel 75.

The panel handling module 300 includes opposing frame members 320, 340, wherein at least one of the frame members 320, 340 is movable (i.e., pivotable) with respect to the other frame member. With the frame member(s) 320, 340 moved to be in an open position with respect to each other, the panel handling module 300 is configured to receive the composite panel 75 therebetween. If necessary or desired, either or both frame members 320, 340 may have adjustable supports 360 engaged therewith, wherein the supports 360 may be moved or re-arranged, as necessary to assist in supporting composite panels having different configurations. The frame members 320, 340 may then be moved to a closed position with respect to each other to thereby secure the composite panel 75 therebetween.

According to aspects of the disclosure, the composite panel 75 may be secured by the frame members 320, 340, and the adjustable supports 360, if implemented, of the panel handling module 300, such that one of the major surfaces 75A, 75B of the composite panel 75 is externally accessible. Moreover, the frame members 320, 340, and the adjustable supports 360, if implemented, are configured and arranged such that the at least one insert-receiving orifice 25 defined by the composite panel 75 is externally accessible. In some instances, the composite panel 75 may be configured to receive fastener insert(s) 50 through both major surfaces 75A, 75B of the composite panel 75. That is, both major surfaces 75A, 75B may define at least one insert-receiving orifice 25. In such instances, the frame members 320, 340 may be collectively mounted so as to be rotatable over at least 180 degrees, such that both major surfaces 75A, 75B of the composite panel 75 are externally accessible. In this manner, the frame members 320, 340 may be configured to secure the composite panel 75 in one orientation such that one of the major surfaces 75A, 75B is externally accessible for installation of appropriate fastener inserts 50 therein, wherein the frame members 320, 340 can then be collectively rotated 180 degrees such that the other of the major surfaces 75A, 75B is externally accessible such that appropriate fastener inserts 50 can then be installed therein.

In some aspects, a registration arrangement 1300 may be operably engaged with one or both of the frame members 320, 340. In general, the registration arrangement 1300 may be configured to interact with the composite panel 75 such that the composite panel 75 is registered with respect to the first coordinate system 1200 upon being secured by the frame members 320, 340 in the closed position. In one example, either or both of the frame members 320, 340 may be configured such that, upon receipt of the composite panel 75 therebetween, the composite panel 75 interacts with an alignment provision (i.e., a mechanical guide) of the registration arrangement 1300 configured to engage one or more features of the composite panel 75 upon insertion thereof, which thereby automatically aligns the composite panel 75 with the first coordinate system 1200 with respect to the origin 1100 thereof.

In other instances, the registration arrangement 1300 may be configured to examine the composite panel 75 secured by the frame members 320, 340, and determine therefrom the relationship of the secured composite panel 75 to the first coordinate system 1200. For example, the registration arrangement 1300 may comprise an image acquisition device (i.e., a digital camera) in communication with a computer device 1500. Images of the secured composite panel captured by the image acquisition device may be directed to the computer device 1500, and features of the composite panel determined by image analysis/machine vision processing. The origin 1100 and the first coordinate system 1200 may thus be registered with the analyzed image of the composite panel 75 to align the composite panel with the first coordinate system 1200.

Registration of the composite panel 75 with the first coordinate system 1200 may be implemented by the fastener insert installation system 100 with regard to installing fastener inserts 50 in corresponding insert-receiving orifices 25 defined by the composite panel 75. That is, the fastener insert installation system 100 may be configured to determine the locations of the insert-receiving orifices 25 in the composite panel 75, according to the first coordinate system 1200, in order to implement an automated fastener insert installation process. As such, in some aspects, the composite panel 75 may have been previously processed upstream through a milling machine/device (not shown) to form the insert-receiving orifices 25 in either or both of the major surfaces 75A, 75B of the composite panel 75. In forming the insert-receiving orifices 25, the milling machine (i.e., a CNC-programmed milling machine) may implement machine code detailing the parameters associated with the orifices 25. For instance, the machine code may include details related to the locations/coordinates of the orifices 25 in relation to a coordinate system (i.e., a "second coordinate system") associated with the composite panel 75, as well as, for example, the configuration of each orifice (i.e., whether a through-hole configuration or a blind hole configuration) and the size (i.e., lateral size or longitudinal size) of each orifice.

Since at least some of this same information included in the machine code is required by the automated fastener insert installation process, aspects of the present disclosure provide that the computer device 1500 is configured to receive or read the machine code implemented by the previous upstream milling machine (i.e., the CNC milling program) for the composite panel 75 subsequently received by the panel handling module 300 of the fastener insert installation system 100. That is, in some aspects, the computer device 1500 or the registration arrangement 1300 associated therewith may be configured such that the first coordinate system 1200 corresponds with the second coordinate system used by the upstream milling machine. As such, upon the first and second coordinate systems being associated by the computer device 1500/registration arrangement, a programming output from the milling machine program code may be used to create fastener insertion data for driving the fastener insert installation process, for example, by allowing the computer device 1500 to identify the insert-receiving orifices 25 and categorize the orifices 25 according to configuration, size, and coordinates (location) with respect to the composite panel 75 or the identified origin 1100 associated therewith. On this basis, the computer device 1500 may be configured to specify the fastener insert configuration (i.e., type) or size or other specification for installation in each orifice 25, an efficient order of installation of the fastener inserts 50 across either or both major surfaces 75A, 75B of the composite panel 75, and, if necessary, may move or adjust any of the supports 360 engaged with the frame member(s) 320, 340 so as to assure external access to the orifices 25 for fastener insert installation.

In order to ascertain that the composite panel 75 received by the panel handling module 300 corresponds to the milling machine program code received by the computer device 1500, the panel handling module 300 may implement certain panel identification measures to minimize or eliminate the risk of an improper fastener insert installation process occurring with the composite panel 75. For example, general identification of the composite panel 75, and information associated with the configuration of each insert-receiving orifice 25 therein, the size of each insert-receiving orifice 25 therein, and/or the coordinates of each insert-receiving orifice 25 in the second coordinate system may be incorporated into a coded indicium (i.e., a bar code or other machine readable code) 1550 associated with the composite panel 75. In such instances, the computer device 1500 or registration arrangement 1300 may further include a code reader device 1600 configured to read the coded indicium 1550 associated with the particular composite panel 75 received and secured between the frame members 320, 340 and to communicate the general identification information and at least information associated with the coordinates of the insert-receiving orifice in the second coordinate system to the computer device 1500/registration arrangement 1300 for association with the first coordinate system 1200. Implementation of the image acquisition device and/or the code reader device 1600 may further allow a feedback loop or system to be implemented by the computer device 1500 to ascertain, for example, that the same software revision and/or revision of the product specification for the particular composite panel 75 was/is being implemented by the upstream milling machine, as well as the fastener insert installation system 100. The information processed in the feedback loop may thus facilitate and ensure, for instance, that the correct fastener insert 50 is being installed in the particular orifice 25, that the correct size of the fastener insert 50 is being selected for the diameter of the orifice 25 or the depth of the composite panel 75, or that any supports 360 associated with the frame member 320, 340 are not impeding access to any of the orifices 25 receiving a fastener insert 50.

The fastener insert assembly module or system 700 as shown, for example, in FIG. 3, is configured to engage each of a plurality of fastener inserts 50 with an installation aide 45. As shown in FIGS. 5A and 5B, a fastener insert 50 for composite panels 75, as disclosed herein, generally includes a body portion 62, an engagement end 64 engaged with one end of the body portion 62, and a retention end 66 engaged with the other end of the body portion 62. FIGS. 5A and 5B schematically illustrate two example fastener inserts 50, wherein the fastener insert 50 illustrated in FIG. 5A has a "blind hole" configuration, and the fastener insert 50 illustrated in FIG. 5B has a "through hole" configuration. The engagement end 64 of the fastener insert 50 defines a plurality of adhesive application orifices 65 extending therethrough from an engagement surface 68 of the engagement end 64, distal to the body portion 62. When installed in the insert-receiving orifice 25 of the composite panel 75, the fastener insert 50 is preferably disposed such that the engagement surface 68 is as close to flush with the one of the major surfaces 75A, 75B defining the orifice 50, as possible (i.e., within a tolerance of about 0.005 inches). As such, it may be desirable to support the fastener insert 50 within the orifice 25 such that the engagement surface 68 is as close to flush as possible with the major surface of the composite panel 75, while an adhesive material is directed through the adhesive application orifices 65 and into the insert-receiving orifice 25 about the body portion 62 of the fastener insert 50, wherein the adhesive material, upon curing, interacts between the fastener insert 50 and the portion of the composite panel 75 defining the insert-receiving orifice 25 to retain and secure the fastener insert 50 therein. In order to support the fastener insert 50 in the desired position within the orifice 25, an installation aide 45 (i.e., a temporary planar tab having a lateral dimension greater than the lateral dimension of the orifice 25) may be affixed to the engagement surface 68 of the fastener insert 50. As such, upon insertion of the fastener insert 50 in the orifice 25, the installation aide 45 engages the major surface about the orifice 25 and supports the engagement surface 68 close to flush with the major surface, while the adhesive material is directed through the adhesive application orifices 65 and about the fastener insert 50 within the orifice 25.

Since the fastener insert 50 must be assembled with the installation aide 45 prior to the fastener insert installation process, a further aspect of the present disclosure provides a fastener insert assembly module or system 700 which may initially be configured to sort the fastener inserts 50 by configuration (i.e., according to a through-hole insert configuration or a blind-hole insert configuration) or size (i.e., according to a lateral size or a longitudinal size) thereof. For example, the fastener assembly module 700 may include three separate hoppers 710, 720, 730 for receiving three different configurations or sizes of fasteners inserts 50. In one instance, one hopper 710 may receive a first configuration/size of a through hole insert, a second hopper 720 may receive a second configuration/size of a through hole insert, and a third hopper 730 may receive a first configuration/size of a blind-hole insert. An alignment provision may be associated with each hopper 710, 720, 730 such that respective fastener inserts 50 fed therethrough are aligned with respect to each other (i.e., such that the longitudinal axes of the fastener inserts 50 are parallel to each other).

A fastener insert manipulation device 750 (i.e., a robotic arm) as shown, for example, in FIG. 3, is configured to select from among the sorted and aligned fastener inserts 50, and to manipulate the selected fastener insert 50 so as to engage the engagement surface 68 of the fastener insert 50 with an engagement surface 47 of an installation aide 45. The installation aides 45 may be affixed (i.e., by a temporary adhesive) to an elongate sheet material 760 in a serial manner, wherein the sheet material 760 can then be wrapped about a roll. The rolled sheet material 760 may be fed to an interaction location so that the installation aides 45 engaged therewith are sequentially presented such that the engagement surface 47 thereof is exposed for interaction with one of the fastener inserts 50. The engagement surface 47 may have an adhesive material (i.e., a temporary adhesive)

engaged therewith. Since each fastener insert 50 defines a plurality of adhesive application orifices 65 spaced apart about the engagement surface 68, and since each installation aide 45 defines a plurality of adhesive application orifices 40 spaced apart about an engagement surface 47 thereof, the fastener insert manipulation device 750 may also be configured to align the adhesive application orifices 65 of each fastener insert 50 with corresponding adhesive application orifices 40 of the installation aide 45.

Such alignment of the adhesive application orifices 65, 40 may be accomplished, for example, by a machine vision/feedback system (not shown) in communication with the fastener insert manipulation device 750. The machine vision/feedback system may be configured to guide the fastener insert manipulation device 750 to orient the fastener insert 50 selected thereby, until the adhesive application orifices 65 thereof correspond and align with the adhesive application orifices 40 of the installation aide 45 at the interaction location. Once the adhesive application orifices 65, 40 of the fastener insert 50 and the installation aide 45 are aligned, the fastener insert manipulation device 750 causes the engagement between the engagement surfaces 68, 47. The fastener insert manipulation device 750 then moves the fastener insert 50, now engaged with the installation aide 45, away from the interaction location such that the installation aide 45 is removed from adherence to the sheet material. The fastener insert manipulation device 750 is subsequently configured to orient each fastener insert engaged with one of the installation aides into an insertion orientation relative to the installation aide, and to store the fastener insert such that no external forces are exerted on the interface between the fastener insert 50 and the installation aide 45 that could cause misalignment between the adhesive application orifices 65, 40. In some instances, a fastener insert supply device 800 may be configured to receive the fastener inserts 50, each engaged with respective installation aides 45, from the fastener insert manipulation device 750, with the fasteners inserts 50 oriented in the insertion orientation relative to the installation aide 45 and sorted according to the configuration or the size thereof. For example, the fastener insert supply device 800 may comprise a series of conveyors 820, 840, 860 each configured to store and serve as a staging area for the different fastener insert/installation aide configurations or sizes, wherein a selected one of the fastener insert/installation aide assembly is already oriented for insertion into the insert receiving orifice 25 in the composite panel 75, and wherein the opportunities for misalignment of the fastener insert/installation aide assemblies between each other, as well as misalignment between the fastener insert 50 and the installation aide 45, are limited or minimized.

As previously disclosed, typical fastener inserts 50 of the types herein may often be installed in the composite panel 75 using a special purpose two-part potting compound as an adhesive material. However, such a special purpose potting compound may include, for example, weight-reducing glass microspheres, which typically require careful handling to avoid damage to the microspheres. As such, bulk mixing and dispensing provisions may not necessarily be desirable or appropriate for such types of adhesive materials. In addition, once actuated by mixing the two parts of the potting compound, the actuated adhesive material has a limited time in which it can be applied (i.e., on the order of 12 minutes maximum application life), and thus the amount of the actuated adhesive material that can be dispensed in connection with the fastener insert installation process is likewise limited. In such instances, one practical solution may be mixing and dispensing small batches of the potting compound, and timing the mixing of a series of small batches to optimize the dispensation of the actuated adhesive material during the fastener insert installation process.

The adhesive material preparation module or system 500 as shown, for example, in FIG. 4, may thus be configured to receive one or more adhesive material kits 550, for example, of the type shown in FIG. 6, and to mix and actuate the adhesive material therein. As illustrated, each adhesive material kit 550 may comprise a tubular body 560 having the two components of the adhesive material therein separated by a membrane (not shown). A plunger/mixer 570 extends longitudinally outward from the tubular body 560. In order to actuate the adhesive material, the plunger/mixer 570 is urged longitudinally with respect to the tubular body 560 so as to rupture the membrane and introduce the two parts of the potting compound to each other within the tubular body 560. The plunger/mixer 570 may be subsequently rotated about the longitudinal axis and simultaneously translated along the longitudinal axis such that the two parts of the potting compound are thoroughly mixed and the adhesive material actuated (which starts the timing of the application life of the actuated adhesive material). Removal of the plunger/mixer 570 from the tubular body 560, following the actuation of the adhesive material therein, leaves a dispensation opening (not shown) in the tubular body 560 through which actuated adhesive material is dispensed.

The adhesive material preparation module 500 may be configured to include a supply device 600 for receiving un-actuated adhesive material kits 550 in a suitable arrangement for providing a continuous supply for use in the fastener insert installation process, with each kit 550 being in a suitable orientation for selection by a manipulation device 625 (i.e., a robotic arm) controlled by a controller device (i.e., the computer device 1500 or other appropriate computer device). Upon selection of a kit 550 from the supply device 600, the kit is moved to a mixing device 650, wherein the kit 550 is then processed to actuate the adhesive material therein. The kit 550 having the actuated adhesive material is then delivered to the fastener insert installation module 900 for use in the fastener insert installation process. In this regard, as previously disclosed, the actuated adhesive material in a kit 550 may have an effective application lifetime on the order of about 11 or 12 minutes. As such, the actual working time in which a kit 550 may be used to dispense the actuated adhesive material may be on the order of about 7 or 8 minutes in order, for instance, to produce a suitable margin of effectiveness before the actuated adhesive material proceeds to cure. The adhesive material preparation module 500 may thus also be configured to prepare a subsequent adhesive material kit 550 for mixing and actuation of the adhesive material therein prior to expiration of the working time of the actuated adhesive material in a previous adhesive material kit 550.

Due to the sensitive timing requirements involved with the use of the adhesive material kits 550, the adhesive material preparation module 500 may also be configured to monitor the operational time for each kit 550. In this regard, the adhesive material preparation module 500 may also be in communication with the controller device for control and/or monitoring thereof. In regard to the timing of the kits 550, a time stamp may be associated with a kit 550 upon actuation of the adhesive material within the kit 550 at the mixing device 650, for example, by scanning a coded indicium (i.e., a bar code) associated with the kit 550 and initiating a timer limited to a predetermined working time, which may be, but is not necessarily, less than the effective application lifetime of the actuated adhesive material in the kit 550. Upon expiration of the working time, the kit 550 is recalled by the controller, recovered and discarded, and replaced with a subsequent kit 550 having actuated adhesive material therein and subject to the same time stamp limitations as the previous kit 550.

It may be possible that the dispensation of the actuated adhesive material from a kit 550 causes the actuated adhesive material in that kit 550 to be exhausted prior to the expiration of the working time. As such, in some instances, each kit 550 may be monitored by the controller device, either directly or indirectly, to determine the amount of the actuated adhesive material dispensed or the amount of the actuated adhesive material remaining. Direct monitoring may be accomplished, for example, with an appropriate sensor in communication with the computer device 1500. Indirect monitoring may be accomplished, for example, through analysis of the order and the configurations of the fastener inserts and the installation rate of the fastener insert installation process for a particular composite panel 75 to determine usage of the actuated adhesive material in a kit 550 in comparison to the working time limit. In any event, the adhesive material preparation module 500 is configured to minimize process down time upon the expiration of a current kit 550 by way of the controller determining that expiration of the current kit 550 and directing the adhesive material preparation module 500 (i.e., the manipulation device 625 and the mixing device 650) to prepare a subsequent kit 550 for deployment at an appropriate time after the expired kit 550 is recovered and discarded.

The fastener insert installation module or device 900 as shown, for example, in FIG. 2, may be engaged with or disposed in proximity to the panel handling module 300, and may include an analysis device 925 configured to determine a configuration or a size of the insert-receiving orifice 25 defined by and extending through a major surface of the composite panel 75 received and secured by the panel handling module 300. A manipulation device 950 is in communication with the analysis device 925 and is configured to select and retrieve one of the plurality of fastener inserts 50 engaged with the installation aide 45, in response to the configuration or the size of the insert-receiving orifice 25 determined by the analysis device 925. The manipulation device 950 is also configured to deliver the selected fastener insert 50 to a fastener installation/adhesive dispenser device 975 configured to insert the selected fastener insert 50 into the insert-receiving orifice 25 such that the installation aide 45 engages the major surface 75A, 75B of the composite panel 75. The fastener installation/adhesive dispenser device 975 is further configured to dispense the actuated adhesive material from the adhesive material kit 550 and through the adhesive application orifices 65, 40 defined by the installation aide 45 and the selected fastener insert 50, and into the insert-receiving orifice 25 about selected fastener insert 50, such that the actuated adhesive material interacts with the selected fastener insert 50 and the composite panel 75 defining the insert-receiving orifice 25 so as to secure the selected fastener insert 50 within the insert-receiving orifice 25 upon curing of the actuated adhesive material. The manipulation device 950 may also be configured to retrieve an adhesive material kit 550 from the adhesive material preparation module 500, deliver the kit 550 to the fastener installation/adhesive dispenser device 975, and recover the kit 550 from the fastener installation/adhesive dispenser device 975 and discard the kit 550 upon expiration thereof.

Initially, the analysis device 925 is configured to inspect the composite panel 75 secured by the panel handling module 300 to determine or confirm whether the insert-receiving orifice 25 defined by the composite panel 75 was formed in a through-hole configuration or a blind-hole configuration, and/or determine or confirm a location, a lateral size (i.e., diameter) or a longitudinal size (i.e., the thickness of the composite panel 75) of the insert-receiving orifice 25. In making such determinations or confirmations, the analysis device 925 may implement, for example, machine vision, laser measurements, or the like. In some instances, the analysis device 925 may be in communication with the computer device 1500. In such instances, the configuration, size, and/or coordinates (location) of the insert-receiving orifice(s) 25 defined by and extending through a major surface of the composite panel 75 received and secured by the panel handling module 300, may already be known by way of the machine code received from the prior upstream milling process. Accordingly, the information gathered by the analysis device 925 may serve to verify or confirm the information included in the machine code from the upstream milling process.

Once the parameters of the insert-receiving orifice 25 have been determined or confirmed by the analysis device 925, the manipulation device 950 is directed to retrieve one of the fastener inserts 50 of the appropriate configuration and size (and having the installation aide 45 engaged therewith) from one of the series of conveyors 820, 840, 860 (staging area) of the fastener insert supply device 800 of the fastener insert assembly module 700, and to deliver the selected fastener insert 50 in an appropriate orientation to the fastener installation/adhesive dispenser device 975 for installation in the composite panel 75. The installation aide 45 engaged with the selected fastener insert 50 may include an adhesive material (i.e., a temporary adhesive) on the engagement surface 47 thereof engaging engagement surface 68 of the fastener insert 50. The fastener installation/adhesive dispenser device 975 is further configured to insert the selected fastener insert 50 into the insert-receiving orifice 25, for instance, such that the fastener insert 50 is centered within the orifice 25. Upon insertion of the fastener insert 50 into the orifice 25, the portion of the engagement surface 47 exceeding the lateral dimension of the engagement end 64 of the fastener insert 50 engages and adheres, via the adhesive material, to the major surface 75A, 75B of the composite panel 75 defining the insert-receiving orifice 25. In this manner, the installation aide 45 secures the fastener insert 50 in a desired position within the orifice 25, and supports the engagement surface 68 of the fastener insert 50 substantially flush with the major surface 75A, 75B or the composite panel 75.

The manipulation device 950 may also be configured to retrieve an adhesive material kit 550 containing the actuated adhesive material (i.e., potting compound) from the adhesive material preparation module 700, and to deliver the kit 550 to the fastener installation/adhesive dispenser device 975. The fastener installation/adhesive dispenser device 975 is further configured to align the dispensation opening of the tubular body 560 of the kit 550 with each adhesive application orifice 40, 65 extending through the installation aide 45 and the engagement end 64 of the fastener insert 50, in turn. For each adhesive application orifice 40, 65, the actuated adhesive material is dispensed from the kit 550 by the fastener installation/adhesive dispenser device 975 by reducing the volume of the tubular body 560 of the adhesive material kit 550. For example, the tubular body 560 may include a movable end plate (not shown) engaged therewith opposite to the dispensation opening, wherein the fastener installation/adhesive dispenser device 975 may be configured to move the end plate toward the dispensation opening along the tubular body 560 in order to reduce the volume within the tubular body 560 and dispense the actuated adhesive material through the dispensation opening. The dispensed actuated adhesive material enters the insert-receiving orifice 25 about the body portion 62 of the fastener insert 50 and is sufficiently viscous so as to flow to fill the space between the fastener insert 50 and the portion of the composite panel 75 defining the orifice 25 (i.e., the honeycomb material structure). In some instances, the actuated adhesive material is dispensed until a certain excess amount or overfill flows back outwardly of the particular adhesive application orifice 40, 65, at which time the fastener installation/adhesive dispenser device 975 ceases dispensing the actuated adhesive material from the kit 550. In some instances, the appropriate excess amount realized through the adhesive application orifice 40, 65 before ceasing the dispensation of the actuated adhesive material may be determined, for example, by the analysis device 925 using machine vision. For example, it may be specified that a sufficient amount of the actuated adhesive material has been dispensed into the orifice 25 about the fastener insert 50 when an adhesive overflow of about 0.25 inches long is detected and determined by the analysis device 925.

Due to the viscous nature of the actuated adhesive material, the dispensation opening of the adhesive material kit 550 may remain in contact with the dispensed actuated adhesive material when the fastener installation/adhesive dispenser device 975 is directed to cease dispensation. In some instance, the fastener installation/adhesive dispensation device 975 may be further configured to exert a negative pressure on the actuated adhesive material, upon dispensation of a selected amount of the actuated adhesive material from the adhesive material kit 550, in order, for example, to retract excess actuated adhesive material from the dispensation opening back into the tubular body 560 of the adhesive material kit 550. That is, for instance, the fastener installation/adhesive dispenser device 975, upon being directed to cease dispensation of the actuated adhesive material from the kit 550, may retract the end plate of the kit 550 away from the dispensation opening by a predetermined amount so as to expand the effective volume of the tubular body 560 and exert a negative pressure on the actuated adhesive material about the dispensation opening. In such instances, the application of the negative pressure may break the flow of the actuated adhesive material from the dispensation opening and provide a cleaner tail end of the dispensed actuated adhesive material and/or the excess amount/overflow associated therewith. The break of the actuated adhesive material may be further facilitated, in some instances, by the fastener installation/adhesive dispenser device 975 moving the dispensation opening of the kit 550 away from the adhesive application orifice 40, 65 concurrently with the application of the negative pressure of the kit 550. Some results of this procedure may be, for instance, a cleaner dispensation opening of the kit 550 for subsequent dispensing of the actuated adhesive material therefrom and/or preventing contamination of the composite panel 75 from excess adhesive material.

Once the dispensation process for one of the adhesive application orifices 40, 65 is completed, the fastener installation/adhesive dispenser device 975 is configured to move the dispensation opening of the kit 550 to each of the adhesive application orifices 40, 65, in turn, until all such adhesive application orifices 40, 65 are determined to demonstrate the specified overflow amount of the actuated adhesive material. As previously disclosed, in some instances, the fastener insert installation module 900 or a component thereof may be configured to limit dispensation of the actuated adhesive material from the adhesive material kit 550 to within a predetermined working time, or to otherwise monitor the dispensation of the actuated adhesive material from a kit, and to direct the current kit 550 to be replaced with a subsequent kit 550 upon expiration of the current kit 550. Once the fastener insert installation process is completed and the adhesive material is cured, the installation aides 45 can be removed from the composite panel 75 by dissolving or otherwise negating the adhesive material securing the installation aide 45 to the major surface 75A, 75B, along with removing any excess/overflow amounts of the cured adhesive material extending outwardly of the adhesive application orifices 40, 65.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. An automated fastener insert installation system for use in a composite panel fastener insert installation process, comprising:

an analysis device configured to determine a configuration or a size of the insert-receiving orifice defined by and extending through a major surface of a composite panel, the configuration of the insert-receiving orifice including whether the insert-receiving orifice was formed in a through-hole configuration or a blind-hole configuration, and the size of the insert-receiving orifice including a lateral size or a longitudinal size of the insert-receiving orifice;

a manipulation device in communication with the analysis device and configured to select and retrieve one of a plurality of fastener inserts engaged with an installation aide, in response to the configuration or the size of the insert-receiving orifice determined by the analysis device, and to insert the selected fastener insert into the insert-receiving orifice such that the installation aide engages the major surface of the composite panel; and an adhesive dispenser device configured to dispense an adhesive material through adhesive application orifices defined by the installation aide and the selected fastener insert, and into the insert-receiving orifice about selected fastener insert, such that the adhesive material interacts with the selected fastener insert and the composite panel defining the insert-receiving orifice so as to secure the selected fastener insert within the insert-receiving orifice.

2. The system of claim 1, wherein the analysis device comprises a laser measurement system or a machine vision analysis system.

3. The system of claim 1, wherein the manipulation device is configured to select a corresponding one of the plurality of fastener inserts engaged with the installation aide, according to the determined configuration and size of the insert-receiving orifice.

4. The system of claim 3, wherein the installation aide includes an adhesive material on a surface thereof engaging the fastener insert, and wherein the manipulation device is configured to insert the selected corresponding one of the plurality of fastener inserts into the insert-receiving orifice such that the surface of the installation aide engages and adheres to the major surface of the composite panel having the insert-receiving orifice extending therethrough, so as to support the selected corresponding one of the plurality of fastener inserts at a desired position within the insert-receiving orifice.

5. The system of claim 1, comprising an adhesive preparation device engaged with the adhesive dispenser device and configured to mix and actuate the adhesive material in an adhesive material kit.

6. The system of claim 5, wherein the adhesive material kit includes a multiple-part adhesive compound, the multiple parts of the adhesive compound, when mixed, forming the actuated adhesive material.

7. The system of claim 5, wherein the adhesive dispenser device is configured to receive the adhesive material kit from the adhesive preparation device, to dispense the actuated adhesive material from the adhesive material kit.

8. The system of claim 7, wherein the adhesive preparation device or the adhesive dispenser device is configured to limit dispensation of the actuated adhesive material from the adhesive material kit to within a predetermined working time.

9. The system of claim 8, wherein the adhesive preparation device is configured to prepare a subsequent adhesive material kit for mixing and actuation of the adhesive material therein prior to expiration of the working time of the actuated adhesive material in a previous adhesive material kit received by the adhesive dispenser device.

10. The system of claim 7, wherein the adhesive preparation device or the adhesive dispenser device is configured to monitor dispensation of the actuated adhesive material from the adhesive material kit with respect to a predetermined working time, and to direct the adhesive preparation device to prepare a subsequent adhesive material kit for mixing and actuation of the adhesive material therein prior to an earlier occurrence of exhaustion of the actuated adhesive material or expiration of the working time of the actuated adhesive material, within a previous adhesive material kit received by the adhesive dispenser device.

11. The system of claim 10, wherein the adhesive preparation device or the adhesive dispenser device is configured to limit dispensation of the actuated adhesive material from the adhesive material kit to within a predetermined dispensation amount of the actuated adhesive material.

12. The system of claim 7, wherein the adhesive dispenser device is configured to dispense the actuated adhesive material from the adhesive material kit through the installation aide and into the insert-receiving orifice about selected fastener insert, and to exert a negative pressure on the actuated adhesive material, upon dispensation of a selected amount of the actuated adhesive material from the adhesive material kit, so as to retract excess actuated adhesive material back into the adhesive material kit.

13. The system of claim 12, wherein the adhesive material kit comprises a container having the actuated adhesive material therein, and wherein the adhesive dispenser is configured to decrease a volume of the container to dispense the actuated adhesive material through a nozzle associated with the container, and to increase the volume of the container to exert the negative pressure on the actuated adhesive material and retract excess actuated adhesive material back into the container via the nozzle.

* * * * *